United States Patent
Cook et al.

[15] 3,682,307
[45] Aug. 8, 1972

[54] WATER FILTER

[72] Inventors: William J. Cook; Robert L. McCain, both of 207 Maple Drive, Daingerfield, Tex. 75638

[22] Filed: Aug. 21, 1970

[21] Appl. No.: 65,807

[52] U.S. Cl. ................210/123, 210/151, 210/257, 210/265
[51] Int. Cl. .......................B01d 23/24, B01d 23/20
[58] Field of Search......210/255, 257, 123, 151, 265, 210/302, 305, 313, 125

[56] References Cited

UNITED STATES PATENTS

| | | | |
|---|---|---|---|
| 1,985,435 | 12/1934 | Watson | 210/151 X |
| 846,845 | 3/1907 | Greth | 210/125 |
| 3,482,695 | 12/1969 | Hansen et al. | 210/257 X |
| 1,990,214 | 2/1935 | Zapffe | 210/255 X |
| 3,545,619 | 12/1970 | Ettlich et al. | 210/265 X |
| 967,244 | 8/1910 | Row | 210/151 |
| 719,357 | 1/1903 | McClintock | 210/125 |

*Primary Examiner*—Frank A. Spear, Jr.
*Attorney*—Schley & Schley

[57] ABSTRACT

A water filter system particularly for iron removal having an aerator, a sedimentation chamber fed by the aerator, a filtration chamber connected with the sedimentation chamber, a gravity drain in the lower portion of the filtration chamber, and a storage chamber connected with the gravity drain. Connections are provided for back washing the filtration chamber without removal of its filtering material. Water for treatment is fed to the aerator wherein it is oxidized and drains to the sedimentation chamber from which it overflows into the filtration chamber, the water passing through the filtering material and exiting through a drain manifold into the storage chamber.

1 Claim, 7 Drawing Figures

PATENTED AUG 8 1972

INVENTORS
WILLIAM J. COOK
ROBERT L. McCAIN

BY Ashley & Ashley

ATTORNEYS

INVENTORS
WILLIAM J. COOK
ROBERT L. McCAIN
BY Ashley & Ashley
ATTORNEYS

WATER FILTER

SUMMARY OF THE INVENTION

This invention relates to a novel water filter system for removing iron and sand as well as unpleasant taste and odor using the steps of aeration and oxidation, sedimentation, and filtration. The filter generally comprises a rectangular tank divided in three compartments providing a sedimentation chamber, a filtration chamber, and a storage chamber. An aerator is supported above the sedimentation chamber for oxidizing the water to aid in iron removal. A float control valve in the latter chamber controls flow through the aerator into said chamber to maintain a desired water level therein. An upright baffle in this chamber prolongs the travel of the water through said chamber into the filtration chamber, communication therebetween being at the tops or upper ends of said chambers. In the filtration chamber, the water is distributed over and down through sand filtering material for the removal of iron and other separable particles suspended in said water. The water drains through a manifold at the bottom of the filter bed into the storage chamber through a control valve which permits the flow rate to be varied between the filtration and storage chambers. Connections are provided for backwashing to clean the filter material without removal thereof. The flow into the storage chamber may be controlled or stopped to prevent turbidity. Gravity flow in the filter bed prevents packing the filter bed, while backwashing allows cleaning of said bed by lifting the filtered out material therefrom.

A construction designed to carry out the invention will be described hereinafter together with other features of said invention

DESCRIPTION OF THE PREFERRED EMBODIMENT

Figure 1:
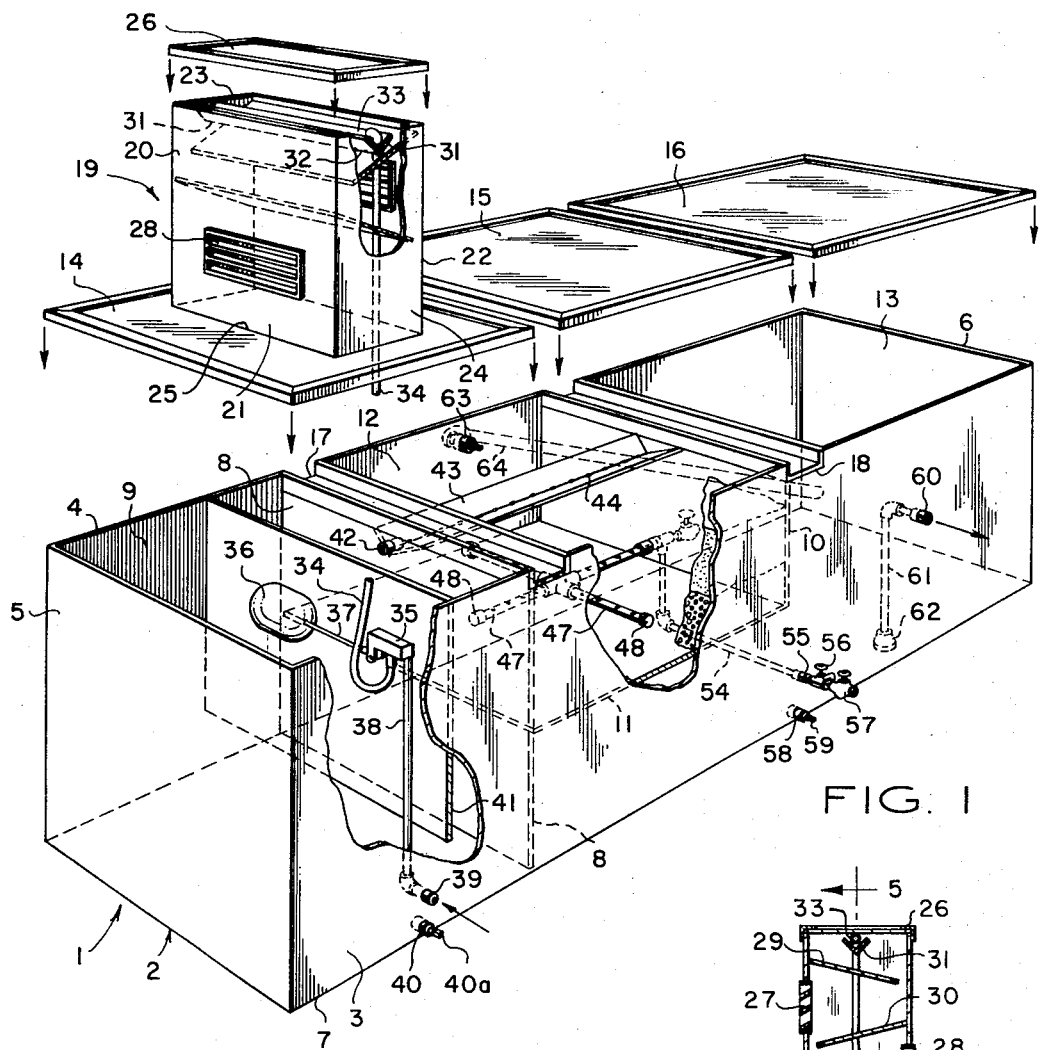
FIG. 1 is an exploded perspective view of a water filter constructed in accordance with the invention.
Figure 2:
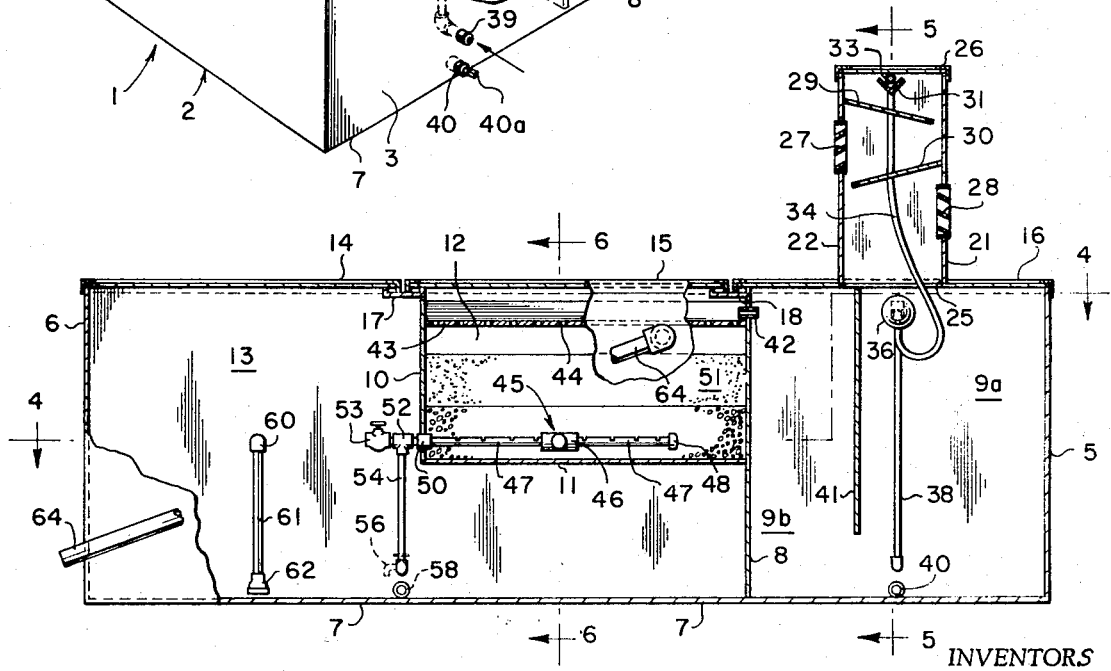
FIG. 2 is a side elevational view, partly in section, of the water filter.
Figure 3:
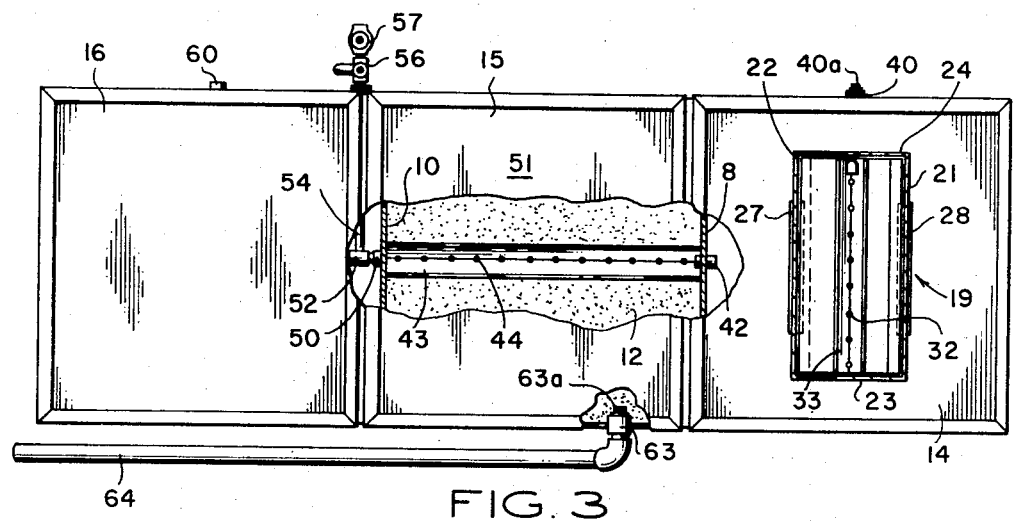
FIG. 3 is a top plan view, partially broken away, of the water filter.
Figure 4:
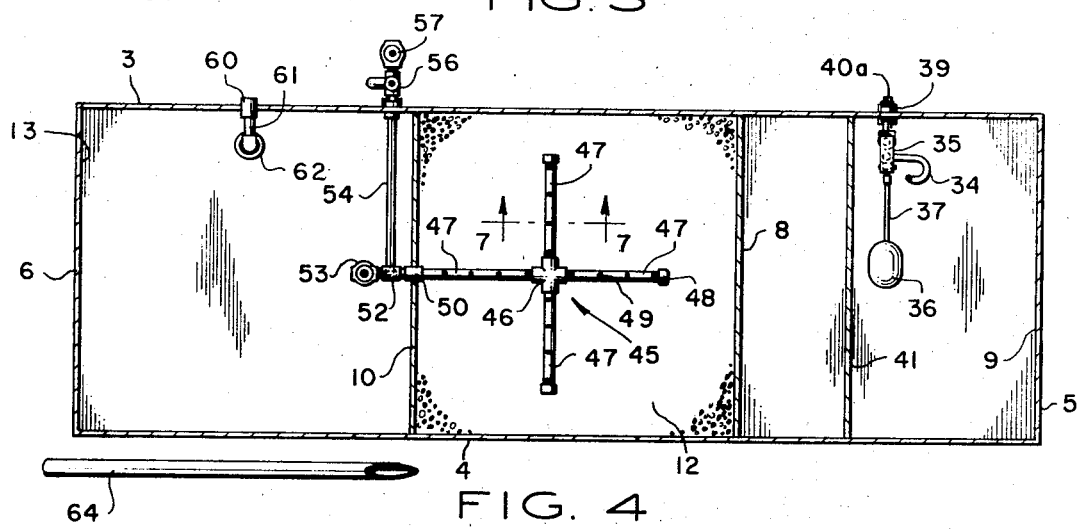
FIG. 4 is a horizontal cross-sectional view taken on the line 4—4 of FIG. 2.

In the drawings, a water filter 1 embodying the principles of the invention and having a rectangular tank or vessel 2 consisting of a front side wall 3, a back side wall 4, opposite end walls 5 and 6, and a bottom wall 7. An internal upright partition or wall 8, extending the full width and depth of the tank 2 and spaced from the end wall 5, defines with the latter a sedimentation chamber 9 at one end of said tank. Another internal upright partition or wall 10, spaced from the walls 5 and 8, extends the full width of the tank and about its upper half and is connected to a horizontal partition or wall 11 to define a filtration chamber 12 at the middle portion of said tank occupying substantially half the depth thereof. The end portion of the tank 2 at the wall 6 and the lower central tank portion below the partition 11 form an L-shaped water storage chamber 13.

Removable flanged lids or covers 14, 15, and 16 are provided to close the chambers 9, 12, 13, respectively, and their flanges overlap the upper wall margins of said chambers (FIGS. 2–6) when resting thereon so as to seal the open tops of said chambers. Inverted spaced transverse channel members 17 and 18 are secured between the front and back walls 3 and 4 across the top of the tank 2 between the chambers to receive the flanges of the covers. The channel 17 is disposed between the chambers 9 and 12, while the channel 18 extends across the tank between the chambers 12 and 13. Thus, flanges of the covers 14 and 15 are received in the channel 17 when said covers are in position on the tank and, similarly, the flanges of the covers 15 and 16 are received in the channel 18.

An aerator 19 having a rectangular housing 20, is secured to and supported by the cover 14 for oxidizing water flowing into the sedimentation chamber 9. The housing 20 has upright side walls 21 and 22 and end walls 23 and 24 fastened to the cover 14 of the sedimentation chamber so that aerated water drops from said housing into said chamber. A rectangular opening 25, complementary to the housing 20, communicates with the chamber 9. The top of the housing is closed by a removable cover or lid 26 having a downwardly turned flanged perimeter for snugly fitting over the upper end of said housing. An upper rectangular louver 27 is provided in the housing wall 22, while a similar lower rectangular louver 28 is mounted in the housing wall to provide air flow through the aerator 19. The housing has a pair of downwardly inclined offset baffles 29 and 30 extending between its end walls 23 and 24 for deflecting the water for optimum aeration. The baffle 29 being secured along a side edge to the inner surface of the side wall 22 and its end edges to the internal surfaces of the 73 end walls of the housing 20. The baffle 30 is similarly secured along a side edge to the internal surface of the side wall 21 and along its end edges to the end walls of the housing. The inner lower edges of these baffles are each spaced from the opposite side walls to provide space within the housing through which water cascades from one baffle to the other.

A V-shaped water-distribution trough 31 is secured near the top of and along the longitudinal axis of the housing 20 between the opposite ends thereof, and has a plurality of spaced openings 32 along its depending apex to allow water to drop onto the upper louver 29. A perforated distributing pipe 33 is supported above the trough and extends along its center line to distribute water along the length of the trough. The pipe 20 communicates with a downwardly extending tube 34 which is connected to a control valve 35 supported within the sedimentation chamber 9 by its end wall 3 and having a float 36, supported on an arm 37. An L-shaped supply conduit 38 extends from the valve 35 through the side wall 3 to a coupling 39 adapted to be connected with a water supply line. The valve 35 controls the flow of water through the aerator 19 in response to the water level in the chamber 9. Drainage of the sedimentation chamber is permitted by a valved fitting 40 in one of the side walls of said chamber near its bottom. An internal vertical baffle 41 extends between the walls 3 and 4 within the chamber 9 so as to divide the chamber into communicating inlet and outlet compartments. The baffle depends from the top of the chamber between the float valve 35 and partition 8 and terminates above the bottom wall 7 of the tank to permit the free flow of water from the inlet compartment to the outlet compartment.

Figures 5, 6, 7:
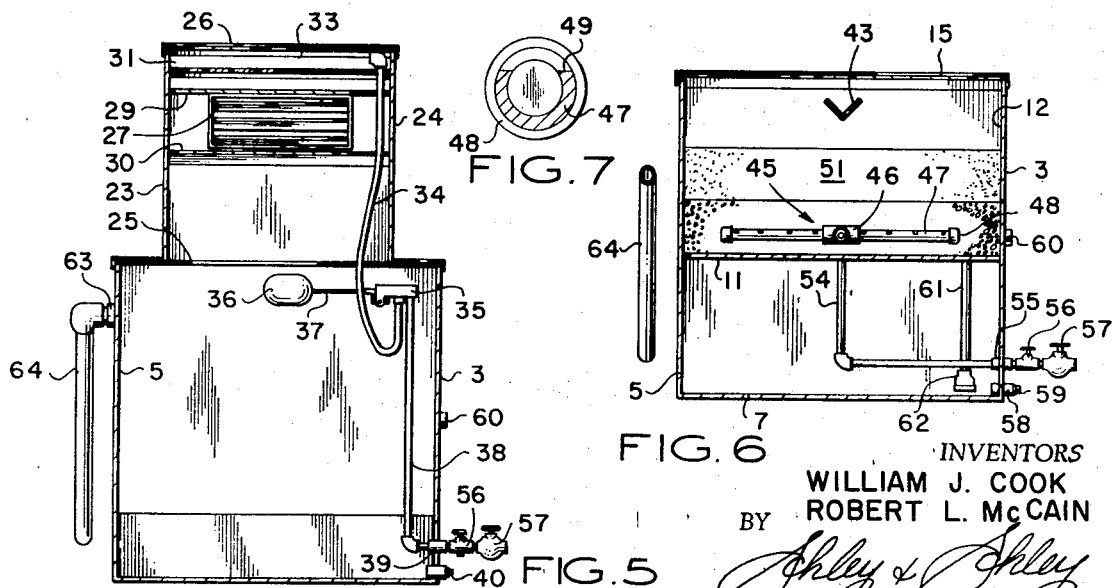
FIG. 5 is a transverse, vertical sectional view taken on the line 5—5 of FIG. 2.
FIG. 6 is a transverse, vertical sectional view taken on the line 6—6 of FIG. 2.
FIG. 7 is an enlarged transverse, vertical view taken on the line 7—7 of FIG. 4 illustrating one of the outlet slots in the drain manifold of the filtration chamber.

The upper portions of the outlet compartment of the chamber 9 communicates with the filtration chamber 12 by means of a nipple 42 extending through the partition 8 near its upper margin. A V-shaped trough 43, having perforations 44 throughout its length, is disposed within the filtration chamber below the nipple 42 to receive and distribute the water across said chamber. The ends of the trough 43 are secured at its opposite ends to the partitions 8 and 10 of the tank 2. A perforated cross-shaped drain manifold 45 is supported within the filtration chamber near its bottom wall 11 for directing filtered water into the storage chamber 13, and comprises a central cross coupling 46 to which are secured four pipe sections 47, three of which are each closed at their free ends by a plug 48. Each pipe section 47 is perforated by longitudinally spaced upwardly-opening lateral slots 49 as best shown in FIG. 7. The drain manifold 45 may be supported in the chamber 12 by connecting one end of one of its pipe sections to a coupling 50 secured through the partition 10. The lower portion of the filtration chamber is filled to a level slightly below the distribution trough by a bed 51 of fine sand so as to cover the drain manifold with a substantial quantity of filtering sand material.

The coupling 50 is connected to a tee 52, one arm of which has a valve 53 mounted therein to establish communication between the manifold 45 and the storage chamber 13 and control the rate of flow from the chamber 2 into the said chamber. The base or depending arm of the tee 52 is connected with an angular conduit 54 mounted in the front wall 3 of the tank by a coupling 55 which is connected with and supports a faucet 56 and a gate valve 57. A drain coupling 58 closed by a plug 59 is mounted in the front wall 3 in communication with the storage chamber 13. A coupling 60 extends through the front wall 8 into the storage chamber and is connected with a downwardly disposed angular conduit 61 which has a foot valve 62 at its lower end spaced from the tank bottom wall 7 for withdrawing water from said chamber. The coupling 60 is adapted to be connected to a pump and conduit system (not shown).

A coupling 63, closed by a plug 63a, is mounted in the back wall 5 of the tank and communicates with the upper portion of the chamber 12 for backwashing the filter as explained hereinafter. The coupling 63 is connected to a drain hose or pipe 64 so that the backwash water flowing through the filter bed may exit from the filter chamber. The backwash water is introduced through the valve 57 and enters the filter bed from the drain manifold 45.

In operation the water filter 1 is connected by the coupling 39 to a source of water to be treated and by the coupling 60 to a conduit system and pump (not shown) for return of the treated water to a flow system.

The water to be treated flows through the coupling 39 and the pipe 38 to the float valve 35. The valve 35, controlled by the float 36, allows the water to flow upwardly through the tube 34 to the perforated distribution pipe 33 above the trough 31 into the aerator 19. The water drops from this trough through its perforations 32 falling on the downwardly inclined baffle 29 and flows downwardly to its lower edge so as to fall to the lower baffle 30. After flowing downwardly of the lower baffle, the water spills from its lower edge and falls through the housing 20 and opening 25 into the sedimentation chamber 9. As the water in the aerator housing runs down the baffles, the current of air within the housing induced by the upper and lower louvers 27 and 28 aerates the water causing it to pick up a substantial amount of oxygen from the air whereby the aeration removes odors and causes iron to drop out of suspension. The aerated water enters the outlet compartment of the sedimentation chamber and, due to the substantial open space below the partion 8, the water level rises in said chamber to the level permitted by the float 36. This level is above the distribution pipe 42 so that the water flows from the chamber 9 into the filtration chamber 12.

The oxidation of the water in the aerator 19 as it flows into the coagulation and sedimentation chamber 9 is conductive to oxidation or iron suspended in the water so as to convert said iron to an insoluble state removable from the water by filtration. In the chamber 9, or prior to admission of the water to the filter, chemicals may be added for flocculation or chemical coagulation in said chamber to facilitate purification of the water. Such chemicals may be aluminum in the form of aluminum sulfate and ferric iron as ferric chloride or ferric sulfate. The baffle 41 increases the residence time of the water within the sedimentation chamber by forcing it to flow downwardly therein beneath the baffle 41 and then upwardly to the nipple 42 before it can egress from said chamber. The float control valve 35 maintains the level within the chamber 9 above the nipple while preventing overflow of the water from said chamber.

After sedimentation and coagulation in the chamber 9, the water flows through the nipple 42 into the distribution trough 43 in the filtration chamber 12. The water spills from the trough through the perforations 44 into the sand filter bed 51 and percolates downwardly therethrough to the drain manifold 45. In the filter bed, the precipated iron and other solid matter including those resulting from agglomeration of colloidal and fine suspended matter into larger masses in the chamber 9 are removed. The water drains from the filter bed through the manifold 45, coupling 50, tee 52, and valve 53 into the storage chamber 13 by gravity. The flow through the valve may be stopped or reduced to keep the water in the storage chamber from becoming turbid. The water is withdrawn from the chamber 13 by a pump (not shown) which picks it up through the foot valve 62.

When it is desired to clean the filter bed 51, the valve 53 is closed and a source of backwash water is connected with the gate valve 57 for back-flowing water through said bed. The backwash water flows upwardly through the pipe assembly 54 into the drain manifold 45 and upwardly through the filter bed, exiting from the chamber 12 through the coupling 63 and the drain hose 64. The various precipitates removed from the treated water by the filter bed are washed from said bed and this removal prevents the same from being compacted and further clogging said bed. After the bed 51 has been washed for a period of time sufficient to clear it, the faucet 56 may be opened to allow some drainage from said bed through the drain manifold 45 to determine if the water is clear and said bed sufficiently cleansed. During the backwashing of the filter as well as checking of its cleanliness, there is no communication with the storage chamber 13 because the valve 53 is closed. When the backwash procedure has been completed the valves 56 and 57 are closed and the valve 53 is reopened to again establish communication of the drain manifold with the storage chamber 13 so that the filter may be placed back in operation.

The water filter hereof provides improved means for treating water, especially iron removal, wherein the water is initially oxidized to precipitate the iron; the water is permitted to settle and the precipitated iron to coagulate; the water is then filtered through a sand bed and removed by gravity drainage; and subsequently the water is passed to a storage chamber from which it is returned to the system. The removable covers of the sedimentation, filter and storage chambers permit ready access to said chambers for cleaning and servicing. The baffle in the sedimentation chamber improves the function of that chamber by increasing the residence time of the water in the chamber, the aerator introduces oxygen into the water to insure iron removal and backwash arrangement insures thorough cleansing of the filter material. The rate of flow may be readily regulated between the filtration and the storage chambers, and the treated water is not withdrawn directly from the filtration chamber by vacuum but rater is permitted to flow by gravity from said chamber into the storage chamber from which it is adapted to be withdrawn. Turbidity of the water is minimized by controlling the flow rate into the storage chamber.

The foregoing description of the invention is explanatory thereof and various changes in the size, shape and materials, as well as in the details of the illustrated construction may be made, within the scope of the appended claims, without departing from the spirit of the invention.

We claim:
1. A water filter including
a tank having a chamber for coagulation and sedimentation of solids; a second chamber for filtering the water and a third chamber for storing the filtered water,
an aerator above the first chamber and having louver and baffle means for oxidizing water flowing by gravity through the aerator into said first chamber,
conduit means communicating with said aerator for supplying water thereto,
a float valve disposed in said first chamber for controlling the flow of water through the conduit means to said aerator responsive to the water level in said first chamber,
baffle means in said first chamber subdividing said chamber into intercommunicating compartments to increase the residence time of the water,
means establishing communication between the upper portions of said first and second chambers,
a water distribution trough extending across said second chamber for receiving filtered water from said first chamber,
a filter bed in said second chamber below the distribution trough,
a drain manifold comprising perforated means disposed in the filter bed near the bottom of said second chamber for gravity drainage of filtered water from said chamber,
valve and coupling means connected with said gravity drain manifold and communicating with said third chamber to control drainage of water from said filter bed through said gravity drain manifold into said third chamber.
valve and conduit means connected with said drain manifold for backflowing water through said filter bed to backwash the same,
a drain coupling communicating with said second chamber for use after backflowing water through said filter bed to permit drainage of the backwash water from said second chamber,
and drain couplings communicating with said first and third chambers for draining both said chambers.

* * * * *